Patented Feb. 3, 1931

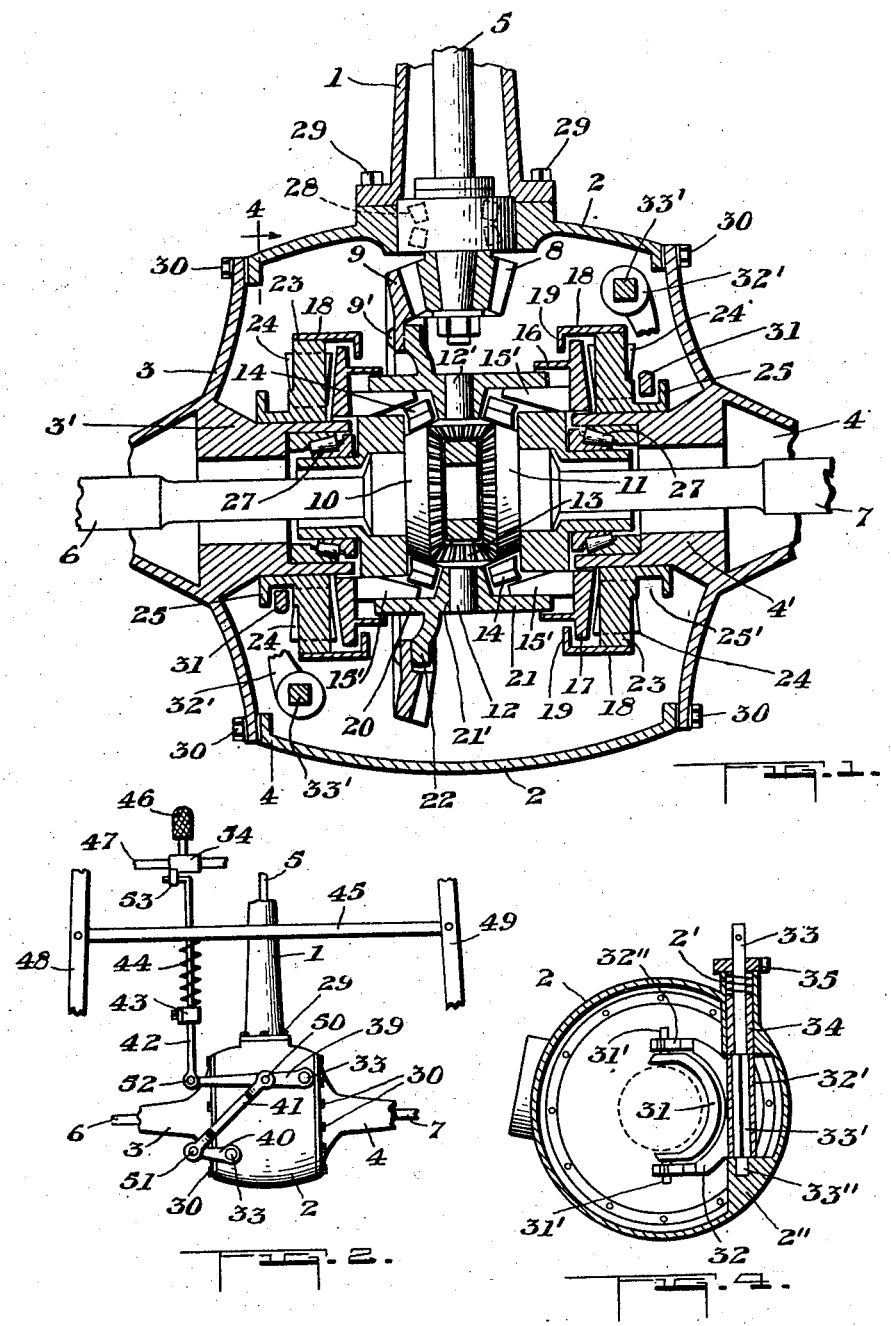

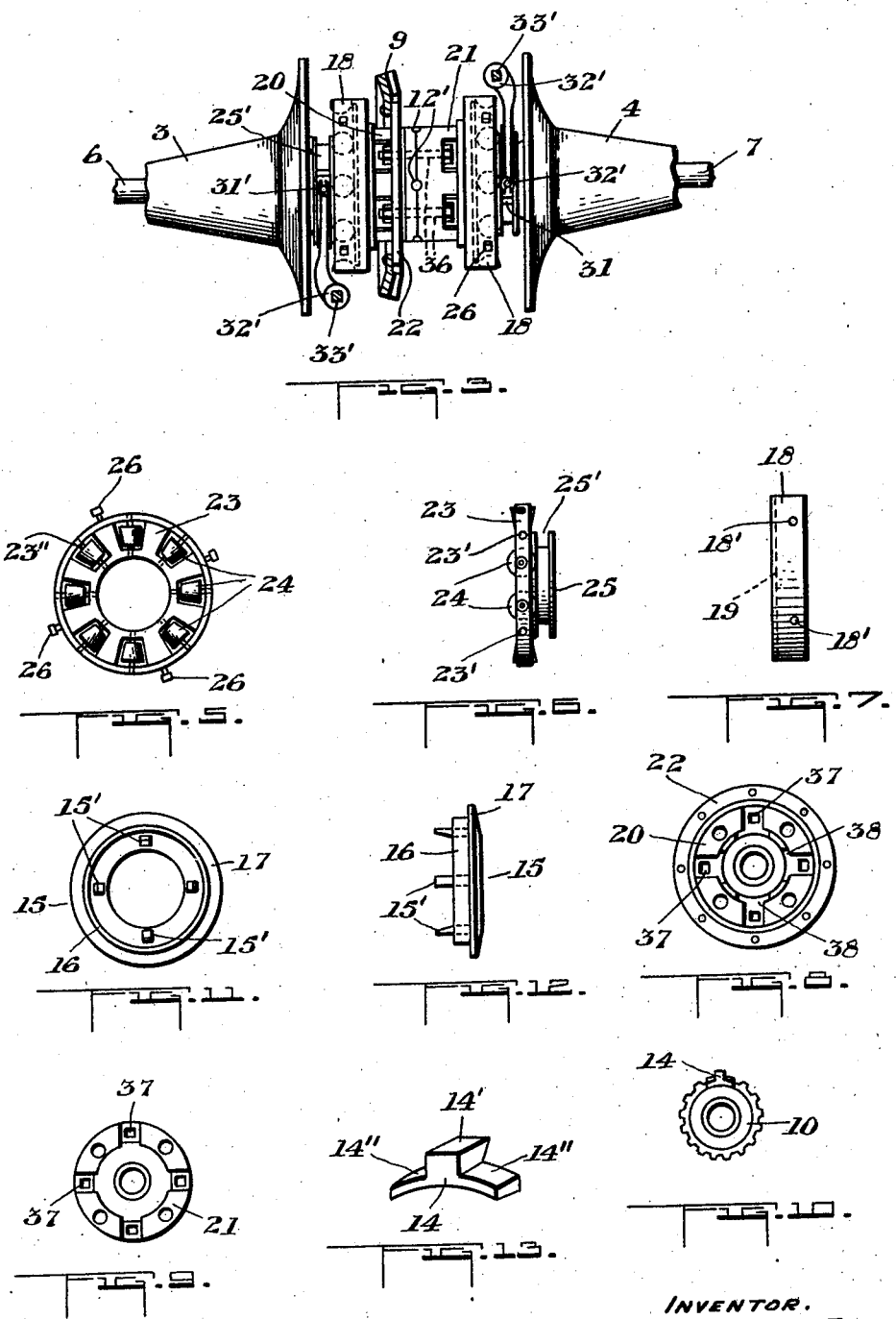

1,791,198

UNITED STATES PATENT OFFICE

FRANK FOCHER, JR., OF HIGHLAND PARK, MICHIGAN

DUAL-CLUTCH MECHANISM

Application filed December 9, 1929. Serial No. 412,865.

This invention relates to motor driven vehicles, and particularly to certain more specific features of the differential gearing.

The object of this invention is to provide an improved form of a novel clutch mechanism, which will transmit the motor power from the rotating differential gear casing to the divided axle shafts equally, and to prevent the racing of either one of the driven wheels.

A further object of this invention is to provide a dual-clutch mechanism which will operate silently and safely, without any undue strain upon the driving mechanism when the dual-clutch is applied and the vehicle is in motion.

Another object of the invention is the provision of a direct control of the dual-clutch mechanism exteriorly of the differential housing, and within reach of the driver, which may be operated to lock the axle shafts against differential rotation or release the same at the driver's will.

The purpose of the differential gearing of a motor vehicle is well known; first, to enable the driver or operator to turn corners under motor power without skidding the driving wheels; second, to prevent unnecessary wear upon the tires; and, third, to provide free control of the steering device when driving at a high rate of speed over the highway or making a long curve in the road.

Furthermore, it is a well known fact that the free differential gearing system used on most automobiles is absolutely necessary and cannot be improved to any advantage in regard to said principles involved.

Certain disadvantages are still found with the differential of a motor vehicle when driving over slippery streets or on bad roads and to remedy this, I have introduced a dual-clutch mechanism adaptable to differential gearing of motor driven vehicles, a device that will permit the differential to function in a normal way under normal conditions, but when it is desired to drive over slippery streets or soft roads and the differential has a tendency to race either driving wheel, this device can then be applied instantly by pressing the foot pedal forward to secure the divided axle sections upon the rotating gear casing by means of the lock-shoes and differential gears. In this manner, a solid live driving axle is assured to drive both driving wheels.

The invention will be more fully understood from the following description when read in connection with the drawings, which form a part of this specification, and will be more clearly pointed out in the claims hereonto appended. It is understood that changes, variations and modifications in details of the invention within the scope of the claims may be had without departing from the spirit or sacrificing any of the advantages here set forth; therefore, I do not confine myself to the exact construction of parts shown in the drawing:

Figure 1 is a horizontal sectional view of a differential on an enlarged scale and showing my invention incorporated therewith.

Figure 2 is a fragmentary detail view of an automobile rear axle and frame and is also illustrative of the controlling means of this invention.

Figure 3 is a fragmentary view partially in section and partially in elevation, showing the position of the parts with reference to each other.

Figure 4 is a transverse vertical section on the line 4—4 of Figure 1, looking in the direction of the arrows.

Figure 5 is a face view of the operating carriage.

Figure 6 is a side elevation of the operating carriage.

Figure 7 is a side elevation of the clutch extracting band.

Figure 8 is a face view of the differential gear case "left", showing the inner walls thereof.

Figure 9 is an end view of the differential gear case "right", showing an adaptation of the clutch mechanism.

Figure 10 is an end view of the differential gear and clutch shoe, showing the position of the clutch shoe upon the gear.

Figure 11 is a face view of the wedge-finger clutch.

Figure 12 is a side elevation of the same member.

Figure 13 is a perspective view of one of the clutch shoes.

This invention is applicable to any differential used in automobile mechanism; therefore, the common type of differential gear is used to illustrate the practicability of the dual-clutch mechanism incorporated with the differential of an automobile. A drive shaft housing 1 is secured to the differential housing 2 with bolts 29, rear axle housing 3 "left" and rear axle housing 4 "right" carry the hollow stub shaft or hub 3' and 4' upon which operating carriages 23 are rotatively mounted and to be shifted thereon. Said axle housings are secured to the main differential housing 2 with bolts 30; drive shaft 5 is provided with bearing 28, the divided axle shaft sections 6 and 7 are of the usual type, drive gear 8 meshing with the ring gear 9 in the usual way, and the ring gear 9 is secured to the gear case 20 upon the circular flange 22 with bolts 9'; differential gears 10 and 11 are secured to the inner ends of the axle sections 6 and 7 and are journaled in the differential gear casing in the usual manner, differential spider 12 and spider gears 13 are of the ordinary type and the construction is well known. Differential pinions or spider gears 13 are rotatively mounted upon the spider pins 12 and are in mesh with the differential gears 10 and 11, and enclosed within the sectional gear case 20 and 21 which are bolted together by means of bolts 36.

It is obvious that the differential mechanism has two sides of identical parts, and likewise the dual-clutch is constructed of elements applied to both sides of the differential gearing, and the parts being identical, it will be sufficient to describe like parts with like numerals.

Clutch shoes 14 are mounted upon the differential gears 10 and 11 and loosely fitted into the pockets 38 of the gear casing 20 and 21; the clutch shoes 14 have two main features, the crown 14' and the shoulders 14'', shown in Figures 10 and 13. The clutch elements 15 are mounted upon the gear case 20 and 21 and in mesh with the said gear case. Features of this adaptation are shown in Figures 1, 8 and 9, and have an axial movement towards and from the center of said gear case for transmitting the motor power from the rotating differential gear case by wedging the shoes 14 upon the bevel surface of differential gears 10 and 11, thereby uniting the axle sections 6 and 7 to equal driving power.

The novel features of the clutch element 15 are shown in Figures 1, 11 and 12. The principal parts are the wedge-shaped fingers 15' extending laterally from the main body, a supporting guide flange 16 formed on the inner face of said clutch symmetrically with the gear case 20, 21, and a circular control flange 17. The extracting band 18 is provided with an inverted flange 19, the purpose of which will be described later. This extracting band 18 is mounted upon the operating carriage 23, being secured thereto by means of screws 26 through the holes 18' and into the threaded holes 23' of the operating carriage 23. The inverted flange 19 of the extracting band 18 withdraws the clutch 15 out of engagement with the shoes 14 when the operating carriage 23 is shifted away from the gear case 20, 21, thus permitting the shoes 14 to rise and free the differential gears 10, 11, allowing the differential to function normally. Recesses 37 are provided in the gear cases to permit free end movement of the fingers 15'.

The differential case 20 "left" and the differential case 21 "right" are constructed in accordance to this invention. The case 20 "left" is provided with an annular flange 22 upon which the ring gear or driving gear 9 is mounted for driving the differential case 20, 21. Further details of the gear case 20, 21 are metrically identical within and without; this will be readily understood by referring to the Figures 1, 8 and 9 of the drawings.

The gear case 20 "left" and gear case 21 "right" are provided with spider spindle seats 21' of the type used on most differentials. The spider 12 is secured between the case 20 and 21 in the usual way. The functions of the differential are generally known, whereas the differential spider 12 is provided with radial spindles or pins 12, usually two or more in number, being integral therewith, and projecting outwardly therefrom through openings or seats 21' in said case 20 and 21. The usual differential or spider pinions 13 are rotatively mounted upon the spindles or pins 12' and adapted to be in engagement with the differential gears 10 and 11, being rotatively mounted within the gear casing 20 and 21, which are provided with hubs integral with the outer ends thereof for the purpose of supporting the inner terminal ends of the driven members or shafts 6 and 7. Said casings 20 and 21 are also provided with suitable bearings 27 and rotatively mounted within the axle housings 3 and 4 on hubs 3' and 4'. The clutch operating carriage 23 is provided with bevel antifriction rollers 24, mounted upon suitable bearing pins 23''. Said operating carriage 23 is also provided with a hub 25, preferably integral therewith. The hub 25 has a circumferential groove 25' to receive a semi-circular collar or yoke 31. Said collar 31 is provided with stub shafts 31' integral therewith for the purpose of controlling the collar or yoke 31 by the forked element 32. Said operating forks 32 are provided with a barrel 32', having a square bore. This feature is shown in Figures 1, 3 and 4, also receiving forks 32". A vertical shaft 33 has a square portion 33' near its center, provided therefore to fit within said barrel 32' and the lower end 33" is smooth and is supported within a suitable bearing seat 2" provided within the main housing 2. An opening 2' is provided through the housing 2 to admit shaft 33. A bushing 34 centers the shaft 33 and a jamb nut 35 secures the vertical shaft 33 in the housing 2, so the shaft 33 can be rotated in the opening 2' and the seat 2" of the housing 2, when it is desired to operate forks 32 with the shaft 33 to control the dual-clutch mechanism for binding or uniting the said axle shafts 6 and 7 with the gear case 20 and 21 for direct drive of the two axles, for the purpose set forth.

The lever arm 39 is secured upon the vertical shaft 33 (right) and a short lever 40 is also secured to the vertical shaft 33 (left) by a suitable key, etc., and is connected to the lever arm 39 by a connecting rod 41 with suitable bearing pins 50 and 51. A pull-rod 42 is connected to the lever arm 39 with a bearing pin 52, shown in Figure 2. A stop-collar 43 is mounted upon the pull-rod 42, being adjustable thereon.

Expansion spring 44 surrounds the pull-rod 42 and is disposed between the stop-collar 43 and transverse bar 45 of the main frame 48 and 49 of the chassis. A foot pedal 46 is provided with a barrel 54 and eye 53; said foot pedal 46 is loosely mounted upon the transverse shaft 47 in a suitable manner and within reach of the driver or operator of the vehicle.

To operate the dual-clutch, it is only necessary to press the foot pedal 46 forwardly. This action will carry the pull-rod 42 forward and compress the spring 44 between the stop-collar 43 and transverse bar 45 and pull the lever arm 39 connecting rod 41 and lever arm 40 forward. The vertical shafts 33 are also being rotated clockwise, thus throwing the forked elements 32 and yokes 31 with the operating carriage 23 up against the outer bevel face of the clutch 15, forcing the clutch wedge-fingers 15' upon the crown shoes 14 and binding the shoes 14 with the differential gears 10 and 11 within said gear casing 20 and 21, thus uniting the two axle sections 6 and 7, causing them to be rotated with the gear case 20 and 21 as a solid live axle, either in the forward or reverse direction, as the case may be. This transmission of power to driving axles 6 and 7 can be applied while the vehicle is in motion without any danger to the gearing.

Now to release the dual-clutch and the differential gears, the foot pedal 46 is released and spring 44 will force the pull-rod 42 rearward. Also the lever arm 39 with the connecting rod 41 and lever arm 40 will rotate the vertical shafts 33 anti-clockwise and shift the operating carriages 23 away from the gear casing 20 and 21; the extracting band 18 will engage the inner side of the clutch ring 17 with the flange 19, thus withdrawing the clutch 15 and wedge-fingers 15' out of binding contact with the shoes 14, permitting the shoes 14 to rise freely off the gears 10 and 11 and allowing the differential gears to function normally.

Having thus described the purpose of my invention, what I wish to obtain by Letters Patent will be set forth in the following claims.

I claim:

1. A dual clutch mechanism of the character described comprising in combination with differential mechanism including a crown gear and differentially rotatable axle shafts provided with operating gears, of a gear housing, a plurality of loosely mounted frictional contact shoes frictionally engageable with the axle operating gears and means for effecting the engagement of the contact shoes.

2. A dual clutch mechanism of the character described, comprising in combination with differential mechanism including a crown gear and differentially rotatable axle shafts, of a sectional gear casing, gear members formed with frictional engaging surfaces mounted on the axle shafts, a plurality of friction shoes engageable with the frictional surfaces of the axle shaft gears, slidable carriage members for exerting pressure on the friction shoes and lever means for regulating the movement of the carriage members.

3. A dual clutch mechanism for motor vehicles comprising in combination with differential mechanism including a crown gear, of a sectional gear housing rotatably supporting the crown gear, differentially rotatable axle shafts associated with the gear housing, differentially rotatable gears mounted on the axle shafts provided with frictional engaging surfaces, a plurality of conically disposed friction shoes normally disengaged from the frictional surfaces of the axle shaft gears, slidable carriage members provided with a plurality of engaging fingers for operative engagement with the friction shoes, lever means for simultaneously operating the slidable carriages and remote control means for operating the lever means.

4. In a dual clutch mechanism for motor vehicles, the combination with a differential mechanism including a crown gear, and differentially rotatable axle shafts, of a gear casing associated with the crown gear, rotatable collars carried by the axle shafts provided with roller bearings, differentially rotatable gears mounted on the axle shafts provided with tapered engaging surfaces, a plurality of friction shoes arranged concentrically of the tapered engaging surfaces of the axle shaft gears, slidable carriage members provided with a plurality of wedge shape engaging fingers normally in disengagement with the friction shoes, lever means for sliding the carriage members into and out of engagement with the friction shoes and remote control means for operating the lever means.

5. In a dual clutch mechanism for motor vehicles, the combination with differential mechanism including a crown gear and differentially operable axle shafts, of a sectional gear casing associated with the crown gear, differentially operable gear members fixedly mounted on the axle shafts formed with frictional engaging surfaces, a plurality of friction shoes arranged concentrically of the frictional engaging surfaces of the axle shaft gears, sectionally formed slidably operable carriage members having a plurality of wedging fingers associated therewith, roller means for permitting the relative rotation of the carriage sections, lever means for simultaneously moving the carriage wedging fingers into and out of engagement with the friction shoes and remote control means for operating the lever means.

6. A dual clutch mechanism for motor vehicles comprising in combination with a crown gear and operating means therefor, of a gear casing associated with the crown gear forming a housing, axle shafts associated with said housing, differentially rotatable gears mounted on the axle shafts, a plurality of conically disposed friction shoes, slidable engaging means provided with a plurality of wedging arms adapted to engage and disengage the friction shoes, lever means for operating the slidably engageable means and remote control means for frictionally locking the axle shafts against differential rotation.

In testimony whereof, I affix my signature.

FRANK FOCHER, Jr.